Feb. 2, 1932.  W. A. JEX  1,843,163
GEARLESS DIFFERENTIAL
Filed Sept. 16. 1929    2 Sheets-Sheet 2
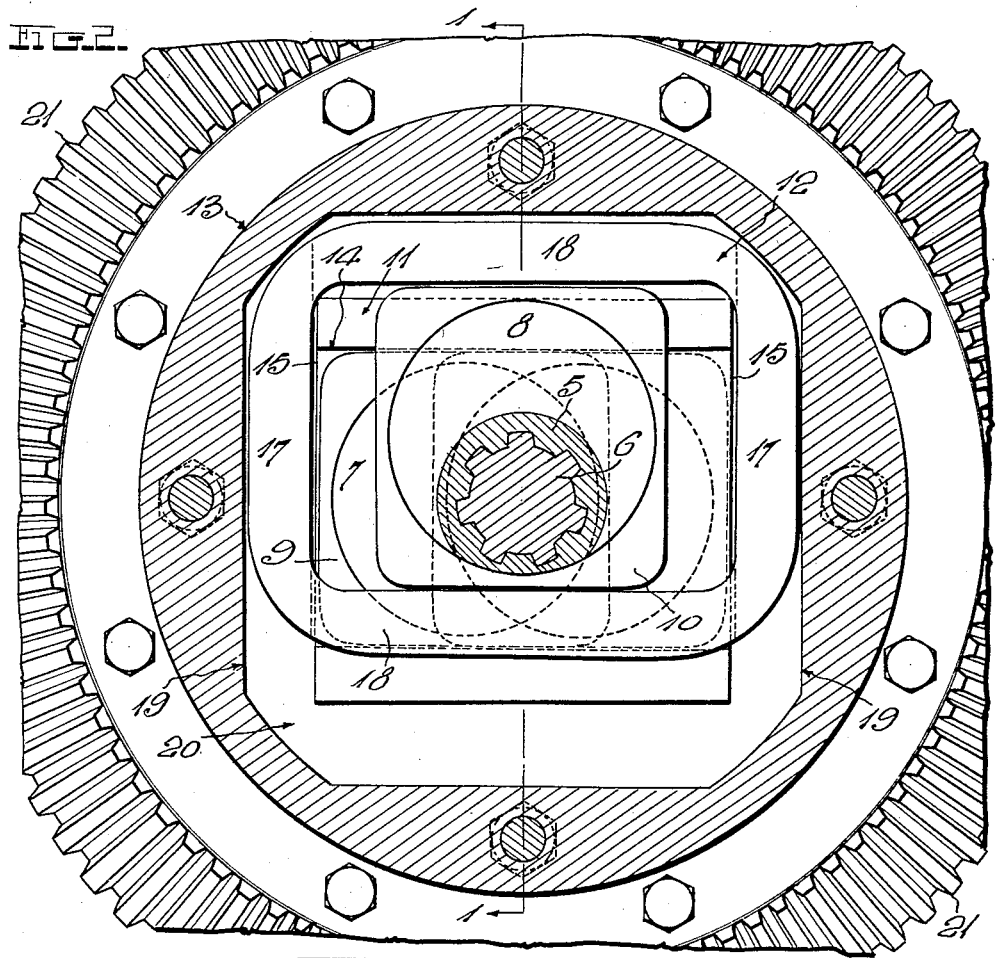
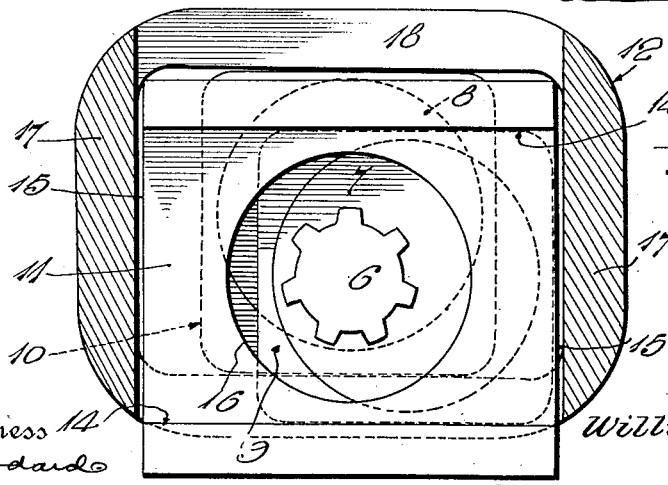
Inventor
William A. Jex Patented Feb. 2, 1932

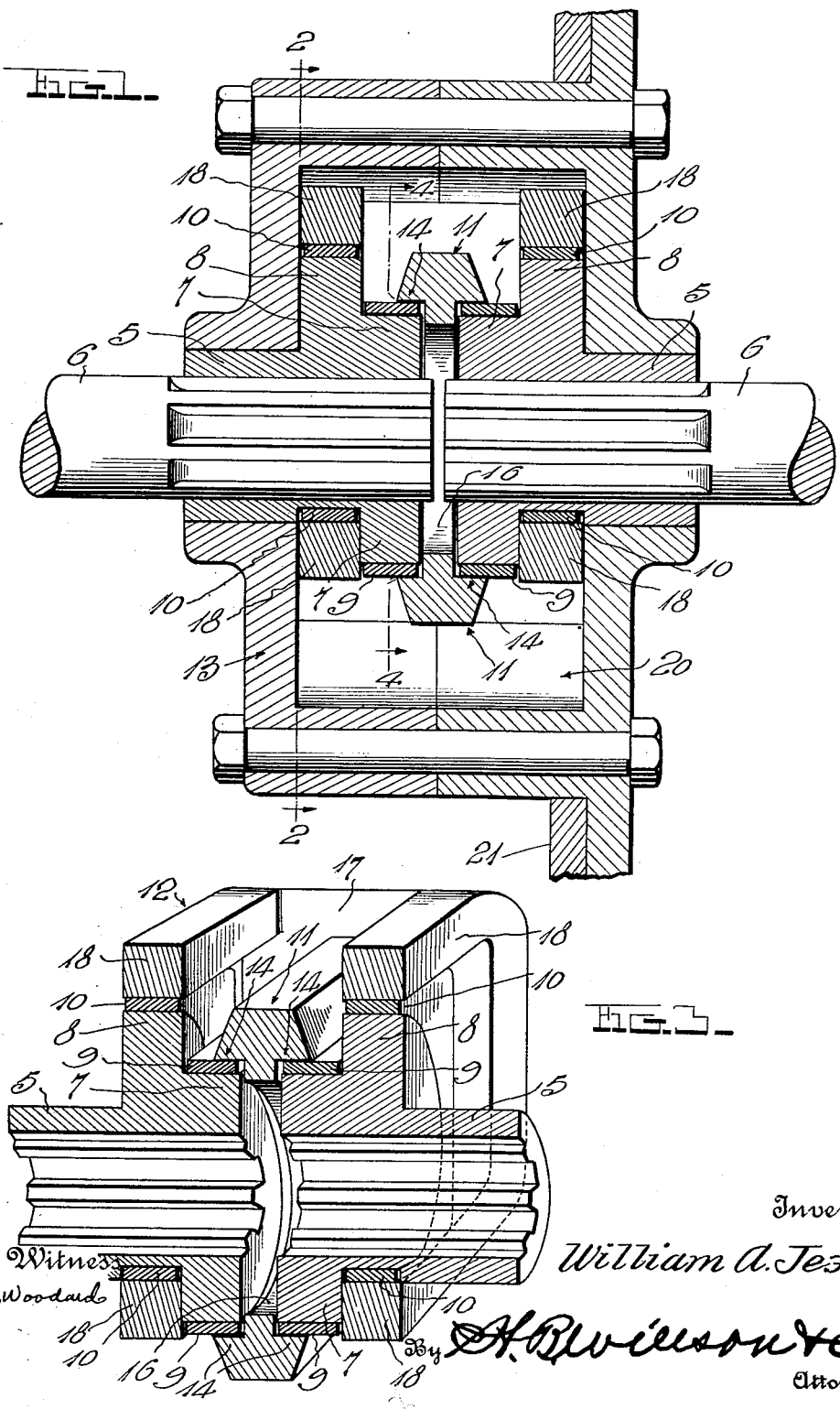

1,843,163

UNITED STATES PATENT OFFICE

WILLIAM A. JEX, OF SOMERVILLE, MASSACHUSETTS

GEARLESS DIFFERENTIAL

Application filed September 16, 1929. Serial No. 392,922.

The invention relates to a gearless differential designed primarily for use on motor vehicles and of such construction as to impart uniform driving torque to both wheels with which the mechanism is used, to impart uniform braking torque to both wheels if a brake be provided acting upon the propeller shaft, and to readily permit relative turning of the wheels when turning the machine. The improved differential is of a general type embodying a driving member, two relatively rotatable members co-axial with said driving member, and a driving connection between said driving member and said relatively rotatable members, said driving connection embodying two eccentrics on said relatively rotatable members respectively, and adapted to move relatively in opposite directions only. Heretofore, for constraining such relative movement of the eccentrics and for preventing them from rotating in the same direction with respect to the driving member, more or less bulky and complicated arrangements of parts have been employed, usually entailing the use of rocking levers or the like. It is the principal object of the present invention however to provide unique eccentric means for preventing any rotation of the eccentrics in the same direction with respect to the driving member and for constraining said eccentrics to move relatively in opposite directions only, and the construction is such that a more condensed structure may be produced.

With the foregoing in view, the invention resides in the novel subject matter hereinafter described and claimed, description being accomplished by reference to the accompanying drawings.

Fig. 1 is a longitudinal sectional view of the improved differential on line 1—1 of Fig. 2.

Fig. 2 is a transverse sectional view on line 2—2 of Fig. 1.

Fig. 3 is a sectional perspective view of the interior movable parts of the differential.

Fig. 4 is a detail transverse section on line 4—4 of Fig. 1.

The form of construction selected for illustration may be considered as preferred and while such construction will be rather specifically explained, it is to be understood that within the scope of the invention as claimed, variations may be made.

The numerals 5 denote two axially alined relatively rotatable members shown in the form of hubs having conventional driving connections with two rear axle sections 6. Each hub 5 is provided with two eccentrics 7—8 whose radial center lines are spaced angularly, preferably 90°. Followers 9 and 10 are engaged with the eccentrics 7—8 respectively, an inner guide member 11 is provided for the followers 9, an outer guide member or cage 12 is employed for the followers 10, and a rotatable driving member in the form of a housing mounted coaxially with the members 5, has a driving connection with the guide member 12.

The guide member 11 permits relative movement of the followers 9 only on unidirectional paths and in opposite directions. Similarly, the guide member 12 allows relative movement of the outer followers 10 only along unidirectional paths and in opposite directions, these paths being unidirectional with those upon which the followers 9 may move. The two guides 11—12 are slidably connected with each other for movement transversely of the aforesaid paths and transversely of the axis of the differential.

Each follower 9—10 is preferably in the form of a parallel-edged block. The inner guide member 11 is preferably formed of a substantially flat plate having parallel longitudinal tracks 14 slidably engaging opposite parallel edges of the followers 9 to guide the latter, said guide member 11 being provided with ends 15 at right angles to the tracks 14. This member is shown as formed with a central opening 16 to accommodate the inner ends of the axle sections 6.

The outer guide member 12 in the construction illustrated, embodies two end members 17 slidably abutting the ends 15 of the inner guide member 11. These end members 17 are rigidly connected by four parallel track bars 18 slidably engaging parallel edges of the followers 10. The end members 17 slidably abut opposed parallel walls 19 of a recess 20 within the housing 13, in which recess all eccentrics, guide members and followers are housed.

The driving member or housing 13 may be driven in any desired manner, for instance, by worm or bevel gearing, a portion of the usual ring gear being shown at 21. When driving straight ahead, all driving force imparted to the member 13 is uniformly imparted to both hubs 5 and consequently to the axle sections 6 and the wheels thereof. The same is true if braking force be applied directly or indirectly to the member 13, that is, such braking force will be uniformly applied to the hubs 5, axle sections 6 and wheels. In case any relative rotation of the axle sections 6 is necessary in rounding curves, one pair of eccentrics 7—8 rotates relatively to the other pair of eccentrics, the two followers 9 slide in opposite directions, the two followers 10 slide in opposite directions, the guide members 11—12 slide upon each other, and said guide member 12 slides diametrically within the housing 13. Thus, necessary relative turning of the axle sections is permitted while continuously imparting uniform driving or braking torque thereto, as circumstances may dictate.

As long as the two eccentrics 8 cannot rotate in the same direction with respect to the driving member 13, a driving connection is established between said member 13 and the two relatively rotatable members 5, and the various features of construction herein disclosed, in the present case embodying two eccentrics 7, constitute eccentric means for preventing any rotation of the eccentrics 8 in the same direction with respect to the member 13, and for insuring that said eccentrics 8 shall move only in opposite directions. It is of course possible that other eccentric means, possibly embodying only one eccentric, could be provided for carrying out this same function, but the use of eccentric means for this purpose, rather than other mechanism, constitutes an advantageous and important advance.

It will be seen from the foregoing that simple and inexpensive provision has been made for carrying out the objects of the invention in an expeditious manner, and attention is again invited to the fact that while the construction shown may be considered as preferred, variations may be made within the scope of the invention as claimed. Moreover, I invite attention to the fact that "eccentrics" as herein used, is to be considered as sufficiently broad to cover any parts having off-center portions to effect the required movements of the followers.

I claim:—

1. A differential comprising a rotary driving member, one guide member having a diametrically slidable driving engagement with said driving member constraining rotation of the two members in unison, a second guide member, the two guide members having slidably engaged portions constituting the sole means for constraining rotation of said second guide member with said driving member, said slidably engaged portions allowing sliding of said second guide member diametrically of said driving member, four followers engaged two with each of said guide members for sliding diametrically of said driving member, two relatively rotatable driven members co-axial with said driving member, and two eccentrics on each of said driven members, one eccentric of each driven member being engaged with a follower of said one guide member, the other eccentric of each driven member being engaged with a follower of said second guide member.

2. A differential comprising two axially alined relatively rotatable members each having two eccentrics whose radial center lines are angularly spaced, parallel-edged followers engaged with said eccentrics respectively, a guide member having parallel guide tracks slidably engaged with the parallel edges of the innermost of said followers, said guide members having ends at right angles to said tracks, a cage embodying end members and parallel track bars joined at their ends to said end members, said track bars slidably engaging the parallel edges of the outermost followers and said end members slidably abutting said end of said guide member, and a driving member coaxial with said rotatable members, said driving member having parallel surfaces slidably engaging said end members of said cage and establishing a driving connection between said driving member and said cage.

3. A differential comprising two axially alined relatively rotatable hubs each having two eccentrics whose radial center lines are angularly spaced, individual followers engaged with said eccentrics respectively, a guide member slidably engaged with the two outermost followers and allowing sliding thereof upon two unidirectional paths, a flat plate between the inner ends of said hubs and disposed in a plane at right angles to the hub axes, the opposite sides of said plate having parallel longitudinal ribs with which the innermost of said followers are slidably engaged for movement on two unidirectional paths, the latter paths being unidirectional with the aforesaid paths, said guide member and plate having a slidable driving engagement with each other for relative movement transversely of said paths, and a driving member concentric with said hubs and operatively engaged with said guide member.

In testimony whereof I have hereunto affixed my signature.

WILLIAM A. JEX.